April 12, 1966 R. W. DE MEYER ETAL 3,245,425
PNEUMATIC CONTROLLER
Filed April 29, 1963
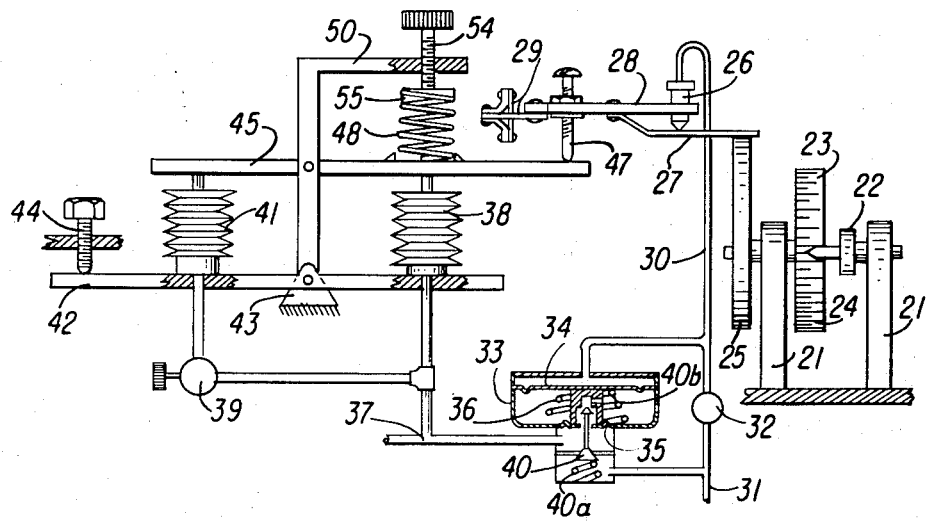
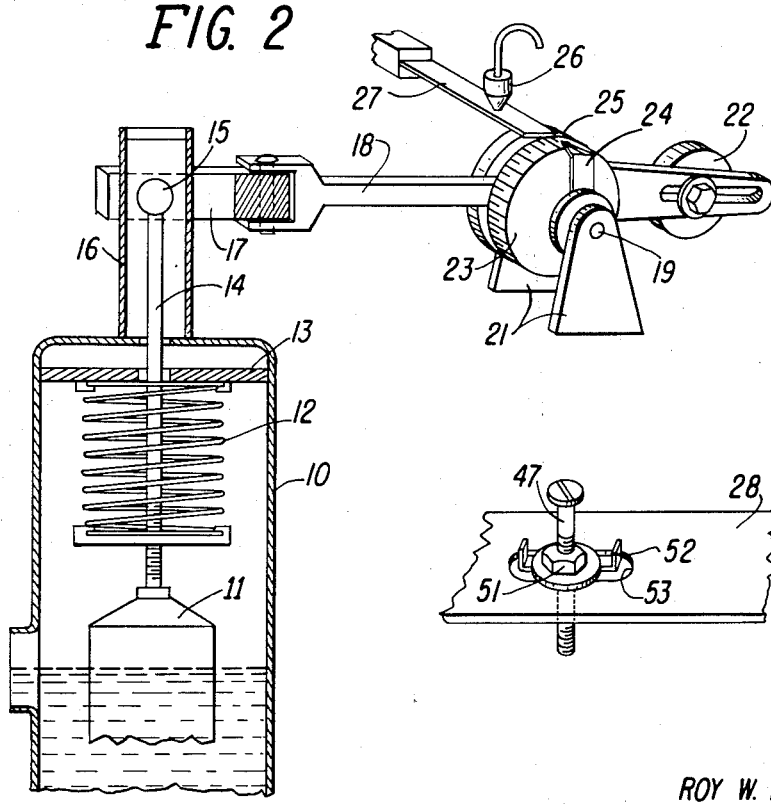
INVENTORS
ROY W. DeMEYER
BY KENNETH H. MAUER.
Bair, Freeman & Molinare.
ATTYS.

United States Patent Office 3,245,425
Patented Apr. 12, 1966

3,245,425
PNEUMATIC CONTROLLER
Roy W. De Meyer, Norridge, and Kenneth H. Mauer, Roselle, Ill., assignors to Magnetrol, Inc., Downers Grove, Ill., a corporation of Illinois
Filed Apr. 29, 1963, Ser. No. 276,327
8 Claims. (Cl. 137—86)

This invention relates to pneumatic controllers and more particularly to apparatus for producing a variable pneumatic pressure or a similar gas pressure in response to changes in a condition to indicate or control the value of the condition.

Difficulties have heretofore been encountered in obtaining a non-linear relationship between a condition to be measured and a change in pressure produced by a pneumatic controller.

It is frequently desirable to have a non-linear relationship for indicating or controlling conditions in which the measuring or sensing means has a non-linear relationship to the conditions as, for example, in the measurement of flow by pressure drop across an orifice.

It is accordingly one of the objects of the present invention to provide a pneumatic controller in which any desired characteristic relationship between changes in the condition and the control pressure produced by the controller can be obtained easily and accurately.

According to a feature of the invention, the condition sensing means moves a cam which controls a flapper valve, the cam being given a desired shape to produce the desired characteristic. Preferably, the cam is rotatable about a fixed axis and is connected to a lever carrying a magnetic element which follows a complementary magnetic element moved by the condition sensing means, such as a displacer for measuring liquid level, flow or the like.

Still another object is to provide a pneumatic controller which utilizes a pressure responsive device to produce a feedback action and a second pressure responsive device to cancel the effect of the first pressure responsvie device to provide a reset action.

According to a feature of the invention, a variable rate spring opposes the first pressure responsive device and is adjustable to vary the calibration or operating band of the controller.

According to another feature, the two pressure responsive devices act in opposite directions on an actuating lever and are in turn mounted on a mounting lever whose limiting position is adjustable to vary the set point of the controller. The variable rate spring is preferably carried by the mounting lever so that changes in the set point will not affect the operating band of the controller.

The above and other objects and features of the invention will be more readily apparent from the following description when read in connection with the accompanying drawing, in which:

FIG. 1 is a diagrammatic view of a pneumatic controller embodying the invention;

FIG. 2 is a partial perspective view with parts in section of the cam mechanism; and FIG. 3 is a partial perspective view of a detail of the adjusting mechanism.

The controller of the present invention is adapted to indicate or control any desired condition such, for example, as liquid level, flow or other physical conditions. The value of the condition is sensed by a sensing device which moves a magnetic element which acts in turn through a second magnetic element to move a cam effecting operation of the controller. In the specific apparatus, as shown in FIG. 2, the device is adapted to indicate or control the liquid level in a tank or container partially indicated at 10 by means of a displacer 11 which follows changes in the liquid level. The weight of the displacer is partially balanced by a spring 12 which is secured at its upper end to a supporting plate 13 in the container and at its lower end to a rod 14 connected to the displacer. This displacer and spring construction are more particularly described and claimed in the co-pending application of Ririe and De Meyer, Serial No. 90,417, filed February 20, 1961.

The rod 14 carries at its upper end a magnetic armature 15 which is movable in a vertical tube 16 of nonmagnetic material secured to the top of the tank. Movements of the armature are followed by a magnet 17 which may be a horseshoe magnet positioned with its opposite legs straddling the tube 16 and which is mounted on one end of a lever 18 pivoted at 19 on supporting brackets 21. The lever preferably extends beyond the pivot and carries a counterbalance weight 22 to counterbalance the weight of the magnet. In this way, the magnet may freely follow movements of the armature 15 by pivoting about its axis.

An indicating dial 23 may be secured to the lever 18 to turn with it about its pivotal axis. The peripheral edge of the dial is calibrated as shown and cooperates with a fixed pointer 24 to give an immediate indication of changes in liquid level. In addition, the lever carries a cam 25 which turns with the lever and which may be shaped according to a desired function of changes in level of the liquid. In the case of liquid level indication the cam could have a straight spiral shape since the relationship is substantially lineal, but for measurements of other conditions the cam could be given any desired shape to correspond to any desired function of the changes in condition.

The cam 25 positions a flapper or supply and waste type valve including a nozzle 26 and a movable vane 27. As shown, the nozzle is supported on an arm 28 which is mounted through a spring 29 for pivotal movement in a vertical plane and the vane 27 is secured to the arm 28 and is flexible to move toward and away from the nozzle. Preferably the vane extends beyond the nozzle with its free end engaging the cam, as shown.

The nozzle is supplied with fluid, such as compressed air, from a supply line 31 past a restriction 32. The restriction is preferably smaller than the nozzle passage so that the pressure in the line 31 between the nozzle and the restriction, designated as 30, will be varied by movement of the flapper toward and away from the nozzle, as is well understood in the art.

The controlled pressure in line 30 back of the nozzle 26 operates a relay device 33 which, as shown, comprises a flexible diaphragm 34 connected on its upper surface to the conduit 30. The diaphragm 34 is connected to a second smaller diaphragm 35 by a tubular housing 36 formed with a valve seat between its ends. The housing is formed above the valve seat with a passage opening into the space beneath the diaphragm 34 which space is vented to atmosphere. Communication between the supply line 31 and an outlet line 37 is controlled by a valve 40 which is urged upwardly to closed position by a spring 40a. A similar spring 40b urges the diaphragm 34 upwardly. The valve 40 has a stem extending loosely through the diaphragm 35 and adapted to seat on the valve seat in the housing 36. With this construction the pressure in line 37 will be maintained accurately proportional to but higher than the pressure in line 30.

The conduit 37 is connected to a pressure responsive expansible motor device shown as a bellows 38 and is also connected through a variable restriction 39 to a similar bellows 41. The two bellows are mounted on a mounting lever 42 which is pivoted intermediate its ends on a fixed pivot 43. Movement of the lever 42 about its pivot in a clockwise direction is variably limited by an adjustable stop 44 which can be adjusted to vary the set point of the device.

The bellows 38 and 41 act oppositely on a lever 45 which is pivoted between the bellows 38 and 41. As shown, the mounting lever 42 is provided with an upward extension 50 on which the lever 45 is pivoted and which extends horizontally spaced from the lever 45 to a position overlying the top of the bellows 38. The lever 45 extends beyond the bellows 38 to engage a zero adjusting screw 47 carried by the arm 28 to determine the position of the arm about its pivot.

As best seen in FIG. 4, the screw 47 is threaded through a nut 51 carried by a spring clip 52 which is slidable in a slot 53 in the arm 28. By threading the zero adjusting screw 47 more or less through the nut 51, the set point of the instrument can be changed, namely the output pressure for a given position of the cam. By sliding the spring clip along the slot 53 to change the point of engagement of the screw 47 with the lever 45 the dial span and cam rise may be matched. This adjustment is also useful to compensate for minor errors in the linkage such as those due to tolerance buildup.

The lever 45 is urged in a clockwise direction against the bellows 38 by a variable rate spring 48 fastened by screw 54 at its upper end. The screw is threaded through extension 50, as shown. A plug 55 carried by the lower end of a screw 54 is threaded into the upper end of spring 48 by means of which the effective length of the spring and accordingly the spring rate can be adjusted. In this way the operating band of the instrument can easily be adjusted.

In operation, when the liquid level is stable and the parts of the device are stabilized they will occupy a position approximately as shown in FIG. 1. At this time, the pressure in the bellows 38 and 41 is equalized so that they exert equal turning force on the lever 45 and the pin 47 engaging the end of the lever 45 holds the nozzle 26 in its set position. If there is a change in the liquid level, say an increase, the displacer 11 will move the armature 15 upwardly and the magnet 17, following movement of the armature, will turn the lever 18 clockwise, as seen in FIG. 2. This will turn the cam 25 to cause a movement of the flapper either toward or away from the nozzle depending upon the characteristic operation desired.

Assuming that the flapper is moved upwardly by the cam it will further restrict the nozzle causing an increase in pressure back of the nozzle and a corresponding increase in pressure in the line 37. This increased pressure will be transmitted immediately to the bellows 38 which will rock the lever 45 counterclockwise to raise the lever 28 and move the nozzle 26 away from the flapper. Movement of the nozzle 25 away from the flapper will again reduce the pressure back of the nozzle and will tend to return the apparatus to a stable condition. However, the change in pressure in the conduit 37 will gradually act on the bellows 41 through the restriction 39 so that after a predetermined time interval the pressure exerted by the bellows 38 will be cancelled. The parts will therefore return to their normal balanced position. In the meantime, the pressure in the conduit 37 will have been transmitted to control devices to effect a correction in the liquid level tending to return it to its desired value and if this has been accomplished by the time the pressures in the bellows 38 and 41 are again equalized, the parts will remain in their set stable position. If there is still a deviation, a correction will be made until the liquid level is again returned to the desired value. The time interval involved can be adjusted by adjustment of the valve 39.

The set point of the controller is easily adjusted simply by adjusting the stop screw 44 to change the normal balanced position of the lever 45. If the screw is turned downward to turn the lever 42 counterclockwise, the maximum downward or stable position of the nozzle 26 will be raised so that the parts of the controller will reach a stable balanced condition with the cam 25 turned in one direction or the other, depending upon its characteristics from its original position. This, it will be seen, can be accomplished easily and quickly and with a high degree of accuracy.

The operating range of the controller can be adjusted by changing the adjusting screw 54 to change the rate of the spring 48. If this spring is shortened and made stiffer, the bellows 38 will have a smaller effect so that the characteristics of the controller will be altered. Again this change can be made very easily and quickly to produce the desired operating characteristics of the device.

While one embodiment of the invention has been shown and described herein, it will be understood that it is illustrative only and not to be taken as a definition of the scope of the invention, reference being had for this purpose to the appended claims.

What is claimed is:

1. A pneumatic controller comprising a vertical non-magnetic wall, a magnetic element movable vertically on one side of the wall, means responsive to a condition to be controlled to move the element, a magnetic follower mounted for vertical movement on the other side of the wall to follow movement of the element, a cam rotatably mounted on a horizontal axis, a lever connecting the cam to the follower to be turned thereby, an arm mounted at one end for pivotal movement, a nozzle carried by the free end of the arm, a flapper mounted on the arm for movement independently of the arm toward and away from the nozzle and operatively engaging the cam to be moved thereby, a fluid supply connection to the nozzle, a restriction in the connection, a fluid pressure responsive device connected to the connection between the nozzle and the restriction and operatively connected to the arm to move it in a direction to follow the flapper, and time delay means to make the said device ineffective after a predetermined time interval.

2. The controller of claim 1 in which the time delay means comprises a second fluid pressure responsive device, a second connection from the second device to the first named connection between the nozzle and the restriction, and a restriction in the second connection.

3. The controller of claim 2 in which the two pressure responsive devices are mounted on a pivoted lever and including means to adjust the angular position of the lever thereby to adjust the set point of the controller.

4. In a pneumatic controller, a fluid discharge nozzle, means mounting the nozzle for movement, a fluid supply connection to the nozzle including a restriction spaced from the nozzle, a restrictor mounted for movement toward and away from the nozzle, means responsive to a condition to be controlled to move the restrictor, a pair of pressure responsive devices connected to the mounting means in opposition to each other, means connecting a point between the nozzle and restriction to the pressure responsive devices to supply thereto a pressure proportional to the pressure at said point, said last mentioned means comprising first conduit means for applying said proportional pressure directly to one of said pressure responsive devices and second conduit means including time delay means for applying said proportional pressure to the other of said pressure responsive devices, a pivoted lever on which the pressure responsive devices are mounted at spaced points, and means to adjust the angular position of the lever thereby to adjust the set point of the controller.

5. In a pneumatic controller, a fluid discharge nozzle, means mounting the nozzle for movement, a fluid supply connection to the nozzle including a restriction spaced from the nozzle, a pivotally mounted flapper movable toward and away from the nozzle, means responsive to a condition to be controlled to move the flapper, a lever pivoted intermediate its ends operatively connected to the nozzle to move it, a pair of pressure responsive devices respectively acting on opposite ends of the lever in opposition to each other, means connecting a point between the nozzle and restriction to the pressure responsive devices to supply thereto a pressure proportional to the pressure at said point, said last mentioned means comprising first conduit means for applying said proportional pressure directly to one of said pressure responsive devices and second conduit means including time delay means for applying said proportional pressure to the other of said pressure responsive devices, a mounting lever for said devices pivoted between them, and means to adjust the position of the mounting lever thereby to adjust the set point of the controller.

6. The controller of claim 5 in which the mounting lever carries an adjustable spring opposing the pressure responsive device which is connected directly to the first connection, the spring being adjustable to vary the operating band of the controller.

7. In a pneumatic controller, a fluid discharge nozzle, a first lever carrying the nozzle, a fluid supply connection to the nozzle having a restriction therein, a pivotally mounted flapper movable toward and away from the nozzle, means responsive to a condition to be controlled to move the flapper, a second lever generally parallel to and spaced from the first lever, means responsive to the pressure in the fluid supply connection between the nozzle and the restriction to move the second lever, an adjusting screw carried by one of the levers and engaging the other to cause the first lever to move when the second lever moves, and means mounting the adjusting screw for movement lengthwise of the levers.

8. The controller of claim 7 in which the pressure responsive means comprises a third lever parallel to and spaced from the second lever, a pair of pressure responsive devices carried by the third lever and acting on the second lever in opposition to each other, means including conduits connecting the pressure responsive devices to the fluid supply connection between the restriction therein and the nozzle, a restriction in one of the conduits, means to adjust the position of the third lever thereby to adjust the set point of the controller, a spring carried by the third lever opposing one of the pressure responsive devices, and means to adjust the effective rate of the spring.

References Cited by the Examiner

UNITED STATES PATENTS

| | | | |
|---|---|---|---|
| 2,472,090 | 6/1949 | Brewer | 137—486 X |
| 2,805,678 | 9/1957 | Panich | 137—86 |
| 2,884,940 | 5/1959 | Gorrie | 137—82 X |
| 3,140,047 | 7/1904 | Holloway | 236—82 X |

ISADOR WEIL, *Primary Examiner.*

A. COHAN, *Assistant Examiner.*